Aug. 6, 1940.  R. T. HOSKING  2,210,455
LOCK NUT
Filed May 31, 1938
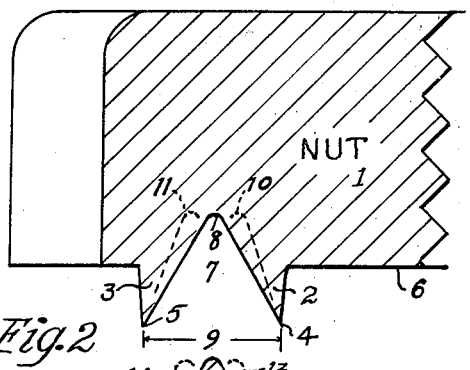
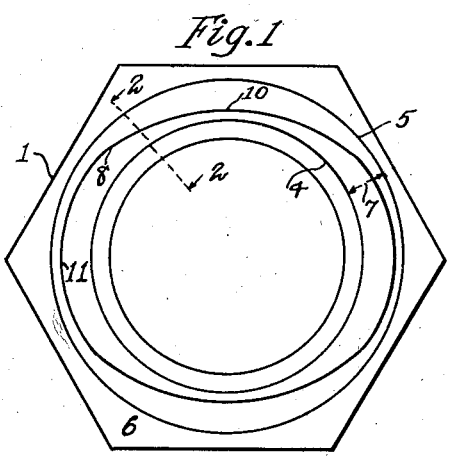
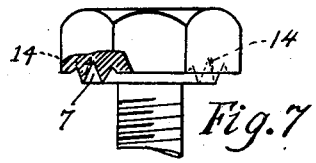
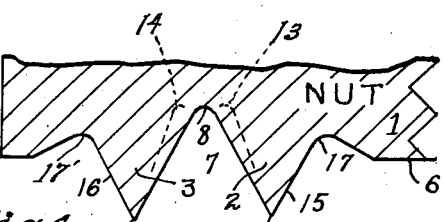
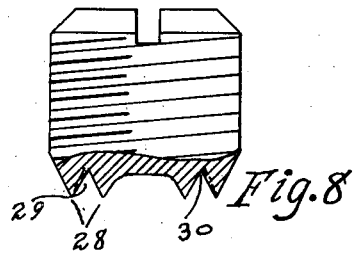
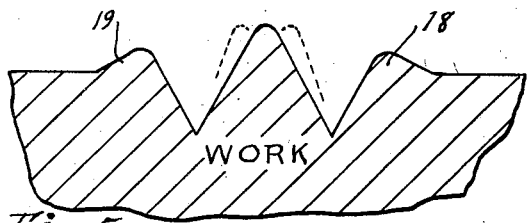
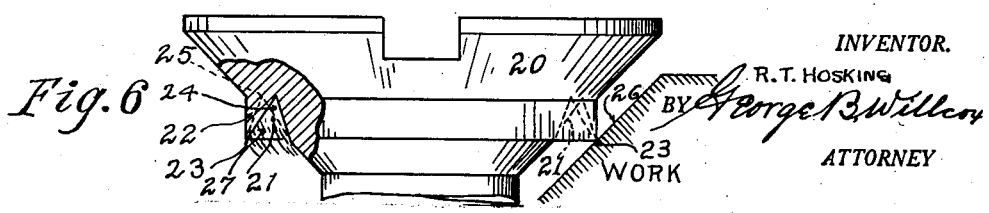
INVENTOR.
R. T. HOSKING
BY George B. Willcox
ATTORNEY Patented Aug. 6, 1940

2,210,455

UNITED STATES PATENT OFFICE 2,210,455

LOCK NUT

Richard T. Hosking, Wilmette, Ill., assignor, by mesne assignments, to Illinois Tool Works, Chicago, Ill., a corporation of Illinois Application May 31, 1938, Serial No. 210,905

5 Claims. (Cl. 151—35)

This invention is concerned with locking devices for threaded rotatable members such as nuts, bolt heads, screw heads, and set screws, all of which for purposes of description herein will be termed nuts.

The improvement pertains more specifically to locking devices of the character described and claimed in United States Patents Nos. 2,096,040 and 2,096,041 granted to me October 19, 1937, wherein a threaded rotatable nut has protuberant arcuate ridge elements on its face arranged to create rib-like wales on the face of a work piece when the nut is tightened. The wales thus formed are arcuate and are offset relatively to each other so they can co-operate with the ridge elements of the nut and thus prevent the nut from loosening in use.

The ridges of the patents, although arcuate are not endless and in that respect differ from my present invention which is characterized by a novel design and arrangement of endless ridge elements on the nut face, and by a new mode of their operation.

The nut is given an extraordinary capacity for being screwed tight and then manually unscrewed from a given work piece many times without unduly straining, cracking, or breaking the metal of the wale on the work. Moreover, only a small amount of turning effort need be exerted on the nut in order to initially lock it against unscrewing, and during further rotations of the nut such locked condition is continually maintained.

Referring now to more specific features of my invention, the ridge elements on the face of the nut are substantially uninterrupted or endless, and are concentric. They are spaced radially from each other and have circular cutting edges that protrude outwardly beyond the plane of the nut face. Between the two endless ridges is an uninterrupted or endless peripheral channel.

The ridges operate by embedding their cutting edges into the work piece while the nut is being screwed down, and by progressive displacing action they raise up from the work a wale that occupies the channel, and the channel acts like an endless rotating mold or pattern and shapes the wale into a likewise endless smooth sided rib of solid metal while the nut continues to rotate in tightening direction.

The channel possesses unique operating characteristics in that it is appropriately shaped to guide the base portion of the wale along a circular path while guiding the apex or top portion of the same wale along a path which is non-circular eccentric with respect to the axis of rotation for at least a part of the length of the channel. The wale flows in such a way that its apex portion yields laterally with a swaying or warping action and so moves more or less sinuously along the channel while its base portion has no such lateral displacement. Consequently, at every stage the nut is kept locked against unscrewing. This feature is novel and characteristic of my invention and gives improved locking co-action between the wale on the work and the ridges and channel on the nut, because the lateral displacement referred to is not abrupt, but very gradual and so preserves the strength of the wale.

In the accompanying drawing, Fig. 1 is a face view of a nut embodying my improvement in a preferred form.

Fig. 2 is an enlarged diagrammatic sectional detail of the ridges on the face of the nut and of the channel between them, the section being on line 2—2 of Fig. 1, and the lateral displacement of the apex of the wale being indicated by dotted lines.

Fig. 3 is a detached diagrammatic sectional view showing how the metal at the face of a work piece is displaced by the ridges on the nut to form two grooves with a raised-up wale between them.

Fig. 4 is a view similar to Fig. 2, showing the invention in somewhat modified form.

Fig. 5 is a view similar to Fig. 3, but showing the work piece corresponding to Fig. 4.

Fig. 6 is a part sectional view of a conical headed screw with my locking device applied thereto.

Fig. 7 is a side view, partly broken away showing the invention applied to the work-engaging face of a bolt head.

Fig. 8 is a similar view showing the application of the invention to the end of a set screw.

Referring to Figs. 1 and 2, a threaded rotatable member, such as a nut 1, a bolt head, screw head, or the end of a set screw, herein designated "nut," has two protuberant concentric circular ridges 2, 3, projecting outwardly beyond the plane of its work-engaging face 6. These ridges are endless and are preferably arris-like in cross-section, being sharp enough at their marginal edges 4, 5, to embed themselves into the face of a work piece while the nut is being rotated on its thread and advanced axially in the tightening direction.

The ridges 2, 3, being spaced apart radially, define between their circular cutting edges 4, 5 an endless channel 7 that possesses novel characteristics for the purposes of my improvement. The wide open mouth 9 of the channel is, of course, circular. The closed apex portion 8 of the channel 7 is, however, eccentric, that is, non-circular, sinuous, or somewhat elliptical for at least a part of its peripheral length. This feature gives the channel various cross-sectional shapes at different places in its length, as is indicated in exaggerated manner at 10, 11, Fig. 2.

Fig. 3 shows a work piece the metal of whose face has been characteristically deformed by the penetrating ridges 2, 3 of the rotating nut, Fig. 2. The displaced metal of the work piece has been molded upwardly between the walls of the channel 7 to present a smooth surfaced arris-like wale 12 which is circular around its base, but is non-circular around its apex. The sinuous lateral offsetting of the apex of wale 12 relatively to the base of the same wale, as is indicated by the dotted lines 13, 14, produces the desired locking effect and the other advantages set forth in the statement of invention.

The locking effect results from the sinuous shape of the channeled apex 8 of the nut—see dotted lines, 10, 11, Fig. 2—in co-operation with the true circular shape of the wide or mouth portion 9 of the channel 7.

Referring now to Fig. 4 which shows a modified form of ridges on the nut, it will be observed that the exterior or flanking walls 15, 16 of the ridges 2, 3 are inclined away from the cutting edges 4, 5, and that circular grooves 17, 17' are provided in the face 6 of the nut, as in Patent No. 2,096,041.

Fig. 5 shows the corresponding imprint in the work piece, where 18, 19 are ribs of metal that have been forced up from the work by the inclined walls 15, 16 and stored in the grooves 17, 17', thus allowing the face 6 of the nut to come face to face against the work when the nut is fully tightened. The outward flare of walls 15, 16 adds width and strength to the ridges 2 and 3 on the nut, increasing their durability, and for some classes of work is a preferred construction.

Fig. 6 shows my improved locking device applied to a countersunk head screw, the view being diagrammatic and partly in section. The tapered head 20 is formed with a circular groove or channel 21 around its periphery and a ridge 22 outside the channel is formed with a downwardly projecting cutting edge 23. The upper or closed apex 24 of the channel is not completely circular, but, like the apex 8 in Fig. 2, is slightly eccentric at some part around its periphery, as indicated by dotted lines at 25, Fig. 6. When the screw is tightened the circular rotating and axially advancing cutting edge 23 bits into the tapered wall 26 of the work piece. As it goes downward the ridge 22 cleaves a ring-like wale of metal 27 from the work, compressing and shaping it to conform with channel 21. During such rotation the apex portion of the wale occupying the narrow part 24 of the channel is deflected radially as indicated by the dotted lines at 25. It is now apparent that the apex of the wale is deformed progressively as the member 20 rotates and travels downward and that this non-circular apex portion is continually kept in locking engagement with the walls of channel 21 and checks any undesired tendency of the member 20 to turn in the loosening direction under the conditions of use of the threaded member, or nut.

Fig. 7 is a side view, partly in section, showing my invention applied to the under side of the head of a threaded bolt, the operation of the device being substantially the same as in Figs. 2 and 4.

A part sectional view of a set screw is shown in Fig. 8, its end being formed with a pair of cutting ridges 28 with a channel 29 between them. The bottom or deep apex portion 30 of the channel is non-circular, as in the examples Figs. 2 and 4, while the ridges 28 that define the marginal edges of the channel are true circles.

My earlier patented devices above mentioned employed one or more arcuate ridges with tapered penetrating ends, and also had diagonal channels at their ends, so that the wales developed on the work piece extended like solid metal dykes clear across the rearward ends of the respective ridges and so presented solid metal abutments directly in the rear of the said ridges.

In the present invention an uninterrupted wale is created on the work face. It is received in a channel between two endless ridges on the nut and the locking effect is attained by shaping the apex portion of the channel so that it causes the tip or edge portion of the wale to assume a non-circular or sinuous form, although the bottom or base of the wale remains circular. A useful characteristic of this construction is that there is almost no tendency to impair or fracture the wale by repeated use. The deflection of the apex of the wale is so slight and moderate that there is practically no likelihood of damaging it by repeatedly applying the nut and then removing it from the same work piece.

Having thus described my invention, what I claim and desire to secure by Letters Patent is:

1. A rotatable threaded member having a work-engaging face; and having in combination, endless circular ridges, arris-like in cross-sectional shape, said ridges being concentric and spaced apart radially and projecting outwardly beyond said work-engaging face, there being an endless channel between the said ridges and projecting inwardly of said face, the mouth or open portion of the said channel being circular and coaxial with the axis of rotation of the said threaded member, whereas the closed or apex portion of the same channel presents a non-circular or wavy conformation for at least a part of its peripheral length.

2. A threaded rotatable member having in its work-engaging face a channel the mouth portion of which is circular in plan, said channel having a closed apex portion sinuous in contour, and circular ridges with cutting edges thereon projecting beyond said work-engaging face and defining the said mouth portion of the channel.

3. A rotatable member screw threaded for effecting clamping engagement with a work piece, having on its work-engaging face ridges projecting outwardly, spaced apart radially and defining between them a peripheral channel; said ridges having cutting edges circular in plan and coaxial with the axis of rotation of the said member, the closed apex portion of said channel being eccentric with respect to said axis for at least a part of the length of said channel.

4. A nut having on its work engaging face a pair of ridges having cutting edges that project beyond the plane of said face, said ridges having their mutually opposed walls shaped to present between them a channel whose open mouth portion is circular, but whose closed apex portion is non-circular.

5. A structure as set forth in claim 4 wherein the outer and inner walls, respectively, of the ridges are substantially perpendicular to the plane of the face of the nut.

RICHARD T. HOSKING.